Patented Jan. 22, 1935

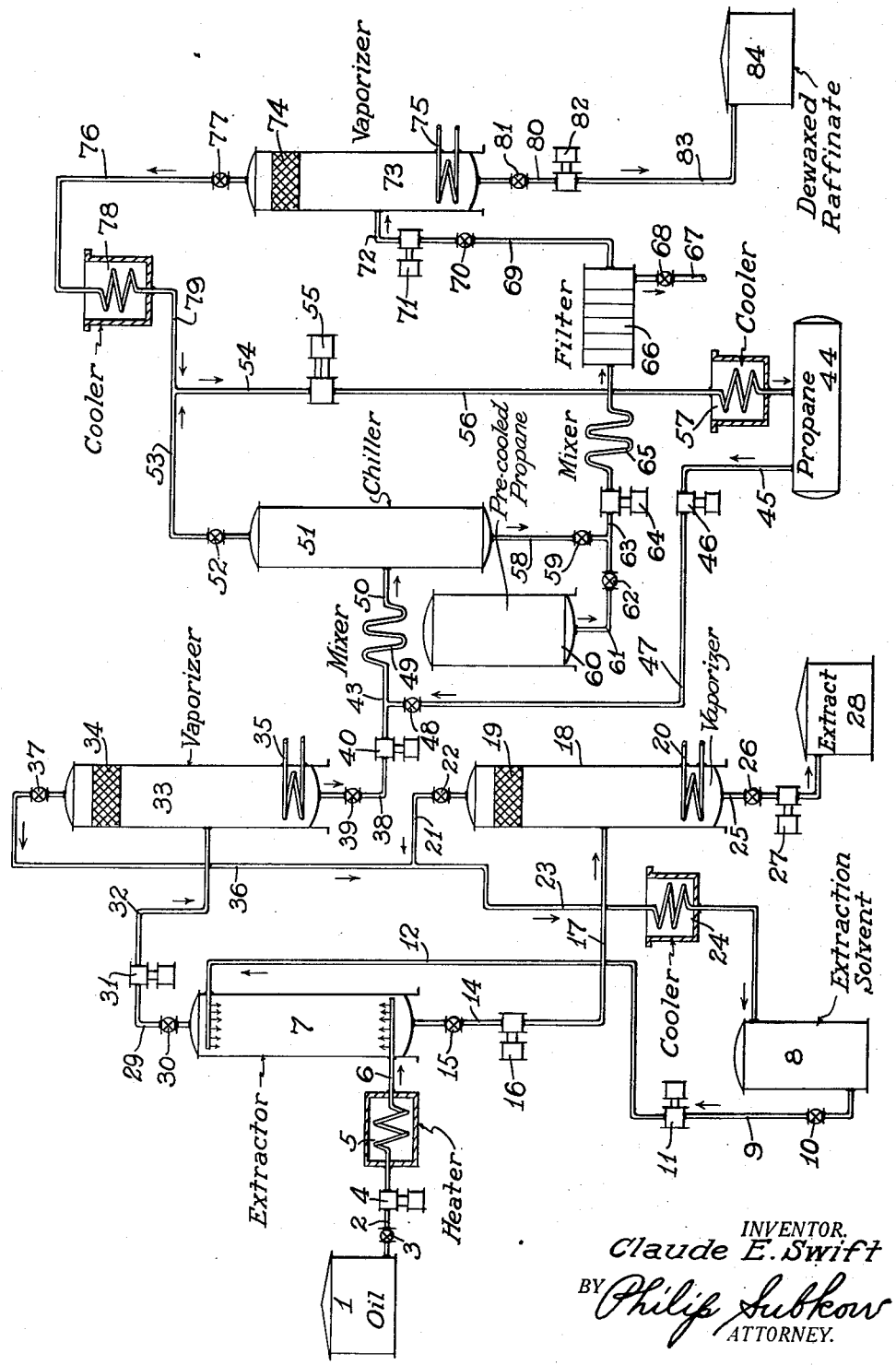

1,988,706

UNITED STATES PATENT OFFICE 1,988,706

PROCESS FOR DEWAXING OILS

Claude E. Swift, Glendale, Calif., assignor to Union Oil Company of California, Los Angeles, Calif., a corporation of California Application December 19, 1933, Serial No. 703,111

12 Claims. (Cl. 196—18)

The present invention relates to a process for separating wax from oils in the production of lubricating oil. More particularly it relates to a process for separating wax from wax containing oils in which a solvent is employed to aid in the separation.

It is an object of my invention to improve upon prior processes for dewaxing oils wherein solvents are employed to aid in the separation of the wax from the oil.

A further object of my invention resides in removing substantially all of the wax from wax containing oils, employing a liquefied normally gaseous hydrocarbon solvent to aid in the separation and to produce lubricating oils of low pour points.

It is a more important object of my invention to precipitate the wax from oils containing the same in a form which is more readily separable by filtration or cold settling than by processes heretofore known, or in other words to provide a process of wax separation in which higher filter or cold settling rates are obtained than in other known processes.

A further object of my invention resides in a process for wax separation wherein the precipitated wax is maintained in suspension of the oil or mixture of oil and solvent in the refrigerating column so that the mixture may be withdrawn from the column without difficulty of clogging or plugging up of the column and transfer lines, and wherein the mixture is subsequently transferred to a wax settler or filter.

I have discovered that when oils containing wax are refrigerated to low temperatures in the presence of controlled quantities of diluents or solvents, or in the substantial absence of such diluents or solvents, the wax will precipitate from the oil in a form which is readily separated from the oil by filtration or cold settling or other means of wax separation. When oils, particularly oil fractions containing crystalline wax, are highly diluted as is now practiced in some of the known processes and then chilled, the wax crystallizes out in a form which is highly undesirable from the standpoint of filtration as it forms a filter cake which is impervious to the passage of oil and thus lowers the rate of filtration considerably. When wax containing oil is refrigerated when diluted with sufficient amount of solvent to maintain the oil in a viscous state at the temperature of wax crystallization, the wax appears to crystallize in the form which presents a pervious wax cake in the filter and permits the passage of the oil through the filter. Thus, by controlling the degree of dilution of the waxy oil with merely a sufficient amount of solvent to lower its viscosity and to prevent the oil, wax and solvent from congealing into a solidified mass at the lower temperatures required to precipitate the wax, and then chilling the mixture to precipate the wax from solution, I have found that this is conducive to the precipitation of wax which is readily separable from the oil. Then by mixing the chilled oil and precipitated wax with an appropriate amount of diluent which has been precooled to a temperature sufficiently low to prevent the solution of the precipitated wax, the viscosity of the chilled mass is altered sufficiently to permit rapid separation as by filtration, cold settling or centrifuging of the precipitated wax from the oil and diluent.

As an example of the method of carrying out the process, I may dilute a waxy oil with sufficient amount of solvent to maintain the oil in a highly viscous state at the temperature of wax precipitation or crystallization. For example, I may mix the wax containing oil with approximately one-half to two volumes of solvent, and then cool the mixture by any refrigerating means, but preferably by means of a liquefied normally gaseous hydrocarbon solvent, such as liquid propane, introduced directly into the oil and then vaporized under reduced pressure which has a refrigerative effect on the remaining solution of oil, wax and solvent. However, I may effect the chilling and wax precipitation by external refrigeration, as is well known by those skilled in the art. A sufficient amount of precooled solvent, such as liquid propane at a temperature of say —45° F. may be added to the chilled mass and then the wax may be separated by filtration, cold settling or centrifuging. Preferably, I desire to add a sufficient amount of precooled solvent so as to increase the volumetric ratio of solvent to oil to approximately 3½ volumes or greater of solvent to one volume of oil in order to provide efficient and rapid cold settling or filtration of the precipitated wax.

As solvents or diluents to aid in the separation of the wax from the oil, I intend to include such hydrocarbon fractions as are normally vaporous at ordinary temperature and pressure. Such hydrocarbons would include methane, ethane, propane, butane, isobutane, propylene, butylene, amylene, and mixtures thereof. Preferably, I desire to employ either propane or a mixture in which the major portion is propane, or in other words, a mixture of hydrocarbons, the major portion of which contain three or less carbon atoms. These volatile solvents may be obtained by rectification of casinghead gasoline by the so-called "stabilization" method now conventional in the natural gasoline industry. They may be obtained as the overhead in the stabilization or as a side stream product from plates near the top of the stabilizing column. When obtained as overhead vapors they are liquefied by compression and cooled in the conventional manner and are drawn off into pressure chambers where they are maintained in the liquid state until used. Such fractions may be maintained in a liquid state at a pressure of approximately 125 lbs. per square inch at a temperature of about 75° F. I also intend to include the use of other dewaxing solvents which are liquid at ordinary temperatures and pressures. Such solvents include alcohol, mixtures of benzene and acetone, dichlorethylene, trichlorethylene, methylene chloride, mixtures of alcohol and ether, naphtha, acetic acid, etc. If desired, these dewaxing solvents may be employed in conjunction with the liquefied normally gaseous hydrocarbon solvents heretofore mentioned.

As important advantages in carrying out my process, I have discovered, in addition to the high rates of separation of precipitated wax from oil as indicated above, that the lubricating oils produced have low pour points, that is, the pour points of the oils as produced by my process are lower than when the waxy oil is refrigerated and the wax separated in the presence of a large amount of solvent. The wax, particularly the wax of low melting point which is normally present in oils, has a solubility in the solvents, even in such solvents as liquid propane and even at the low dewaxing temperatures of —10° to —50° F., which is considerable, so that when the solvent is vaporized from the dewaxed solution of oil, the wax will remain behind in the oil and thus cause an increase in the pour point of the lubricating oil. On the other hand, I have observed that when precooled solvent is added to the refrigerated oil and precipitated wax in an amount to permit efficient wax separation by filtration, cold settling or centrifuging, the precipitated wax will not redissolve in any substantial amount in the precooled solvent and thus a sufficient amount of solvent is present to give economical wax separation rates without causing an increase in the pour point of the oil.

Another important advantage of precipitating the wax in the presence of a low solvent to oil ratio, resides in the fact that the precipitated wax will not settle to the bottom of the chilling column as readily as when a large solvent to oil ratio is employed. The highly viscous character of the oil and solvent at the wax crystallization temperature does not permit any substantial amounts of precipitated wax to settle to the bottom of the chamber and thus the mixture of oil, precipitated wax and solvent may be efficiently removed from the chilling chamber and transferred to the wax separating apparatus without danger of plugging up at the bottom of the chilling chamber or transfer lines.

From the above discussion of my invention, it is apparent therefore that stated broadly, my invention resides in a process for separating wax from oils containing the same in which the wax containing oil is commingled with a small amount of diluent, the mixture is then chilled to precipitate the wax present in the oil and the precipitated wax separated in the presence of added precooled diluent. The invention has, as one of its features, the use of a liquefied normally gaseous hydrocarbon solvent, such as liquid propane, as a diluent for effecting refrigeration of the oil to precipitate wax and to give rapid settling or filtration of the precipitated wax from the oil.

More specifically, my invention comprises a process for dewaxing lubricating oil stocks wherein the oil is dissolved in a small amount of a liquefied normally gaseous hydrocarbon solvent, such as liquid propane, under pressure sufficient to maintain the solvent in a liquid state, the amount of solvent added being merely sufficient to reduce the viscosity of the oil and to prevent the oil, wax and solvent from congealing at the lower temperatures of wax precipitation, in vaporizing solvent under reduced pressure to chill the oil and precipitate the wax, in then adding precooled solvent to the mixture to increase the volumetric ratio of solvent to oil containing the precipitated wax in order to provide for efficient and rapid settling or filtration of the precipitated wax from the oil and solvent, in then removing the precipitated wax from the chilled oil and solvent by filtration, cold settling or centrifuging, and in finally separating the solvent from the oil. The invention is particularly adapted towards the separation of wax from oils containing crystalline wax, such as oil fractions which have been distilled as overhead fractions, or oils which have been cracked or otherwise precipitated to convert or change the wax present to a crystalline form or other types of oils containing crystalline wax. However, the invention is not to be construed as being limited to the treatment of such oils, since the process may be carried out to advantage on such other types of oils as residual oils, or topped crudes containing wax, or other oils containing amorphous wax, or wax in a form other than crystalline.

Other objects and advantages of my invention will be apparent from the following description of my invention taken from the drawing which refers to a schematic arrangement of apparatus for carrying out the invention.

Referring to the drawing, a wax containing oil substantially free from asphalt, such as an overhead distillate produced from a waxy topped crude, is first treated with a selective solvent which is used to separate the oil into an oil fraction of high paraffinicity containing the wax and an oil fraction of low paraffinicity. As selective solvents, I may employ liquid sulfur dioxide, benzol or mixtures of liquid sulfur dioxide and benzol, phenol, chloraniline, etc. The wax containing oil is taken from tank 1 and is drawn into line 2 controlled by valve 3 by pump 4 which forces the oil through heater 5 which heats the oil to an appropriate extraction temperature depending upon the type of selective solvent employed. When using phenol as a selective solvent, the oil is heated to approximately 125° F. The heated oil is then passed via line 6 into the lower zone of extractor 7. Phenol from tank 8 is withdrawn via line 9 controlled by valve 10 and pumped by pump 11 through line 12 into the upper zone of extraction column 7. Due to the difference in specific gravity of the oil introduced into the lower zone of the extraction column and the phenol introduced into the upper zone of the extraction column, these two liquids tend to separate. As the phenol descends through the extraction column, it dissolves certain components present in the oil comprising the fractions of low paraffinicity, leaving undissolved the fraction of high paraffinicity. Approximately two to three volumes of phenol to one of the oil should be employed to obtain the desired separation of the oil into paraffinic and non-paraffinic fractions.

The extract phase of the extraction comprising phenol and oil fractions of low paraffinicity is removed from the bottom of the extraction column 7 via line 14 controlled by valve 15 and sent by pump 16 through line 17 into vaporizer 18 provided with mist extractor 19 where the phenol present in the oil is vaporized by the aid of steam circulated through closed coil 20 and passes through line 21 controlled by valve 22 into line 23, condensed in condenser 24 and passed into phenol storage tank 8. The phenol soluble constituents of the oil or extract are removed from the bottom of the vaporizer 18 via line 25 controlled by valve 26 and pumped by pump 27 into storage tank 28.

The ascending column of oil or raffinate phase of the extraction in column 7 from which the phenol soluble constituents have been removed but containing wax and wax-like impurities passes into line 29 controlled by valve 30 and pumped by pump 31 through line 32 into vaporizer 33 provided with mist extractor 34 where the phenol present in the oil is vaporized by the aid of steam circulated through closed coil 35 and passes via line 36 controlled by valve 37 into line 23, condenser 24 and storage tank 8. The refined oil is withdrawn from the bottom of the evaporator 33 via line 38 controlled by valve 39 and is pumped by pump 40 into line 43 where it meets a stream of liquefied normally gaseous hydrocarbon solvent or diluent such as liquid propane taken from storage tank 44 via line 45 and pump 46 which forces the liquid propane through line 47 and valve 48 into line 43. The amount of propane introduced into the raffinate will depend upon the character of the raffinate but preferably should be sufficient merely to reduce the viscosity of the raffinate somewhat. Approximately one-half to two volumes of liquid propane may be mixed with one volume of the oil. The mixture then passes through turbulence or mixing coil 49 and then through line 50 into chilling column 51 where sufficient propane vaporizes to reduce the temperature of the remaining material to a low temperature sufficient to precipitate the wax content in the oil. The temperature in chiller 51 is reduced to approximately —10 to —50° F. and preferably at a gradual rate, i. e. not in excess of 3 to 4° F. per minute. This may be accomplished by controlling the pressure in chiller 51 by the proper operation of valve 52 on line 53 and compressor 54 which is connected to the chiller by lines 53 and 54. The pressure will be gradually lowered in column 51 to about 0 lbs. gauge which corresponds to a temperature of approximately —10 to —50° F. The propane evaporating in column 51 is withdrawn via line 53 controlled by valve 52 and passes via line 54 to the suction of compressor 55 where the vapors are compressed, pass through line 56, liquefied in cooler 57 and run down to propane storage tank 44.

Due to the fact that sufficient time must be given to chill the solution of oil and propane gradually in column 51 and to make the process continuous, a plurality of chilling columns 51 may be provided and operated alternately. If the solution of oil and propane entering the chiller does not contain sufficient propane to give the desired refrigeration of the oil by evaporation of propane, further quantities may be added to the oil during chilling.

When the desired temperature has been reached in the chiller, the mixture of oil and propane containing the precipitated wax is withdrawn via line 58 controlled by valve 59 where it meets precooled propane at a temperature of about —10 to —50° F. taken from storage tank 60 via line 61 controlled by valve 62. The amount of cold propane mixed with the chilled propane oil solution containing precipitated wax will depend upon the amount of propane remaining in the mixture when removed from chiller 51. Generally, I prefer to add a sufficient amount of precooled propane to the mixture so that the entire propane content of the mixture will be between 3½ and 4½ volumes of propane to one volume of oil containing the precipitated wax. This amount is sufficient to obtain the increased filtering or cold settling rates of the precipitated wax. The chilled mixture is then drawn into line 63 and pumped by pump 64 through turbulence or mixing coil 65 and thence through filter 66 where the precipitated wax is separated from the propane oil solution. The separated wax is withdrawn from the filter via line 67 controlled by valve 68 and passed to suitable heating and propane separating apparatus. The vaporized propane may be compressed, cooled and returned to propane storage tank 44. The wax free solution of propane and oil is passed through line 69 controlled by valve 70 and pumped by pump 71 through line 72 into heater 73 which is provided with mist extractor 74 where the propane present in the oil is vaporized by the aid of steam circulated through closed coil 75. The vaporized propane passes out of heater through line 76 controlled by valve 77, cooled in cooler 78 and then passes through lines 79, 54 to compressor 55, cooler 57 into propane storage tank 44. The dewaxed propane free oil passes from the bottom of heater 73 by means of line 80 controlled by valve 81 to pump 82 which passes the oil via line 83 into storage tank 84.

The dewaxed oil may be chemically treated, as for example, by means of sulphuric acid to remove unsaturated oil and other impurities and is then water washed and neutralized with alkali, such as sodium hydroxide and/or clay. The chemical treatment may be performed in the presence of a diluent such as the propane employed in the dewaxing stage and this operation may be carried out either subsequent to the dewaxing while the solution is in a chilled condition, or prior to the wax separation stage, as, for example, subsequent to the refining of the oil with the selective solvent as phenol.

As a modification the oil to be dewaxed may be mixed with a small quantity of a wax crystallization regulator, chilled to a temperature sufficiently low to crystallize the wax, diluted with precooled diluent and then passed to wax separation means to separate the wax from the diluted oil. As wax crystallization regulators I may employ such materials as asphalt, metallic soaps, such as iron stearate or aluminium stearate, condensation products produced by treating a mixture of chlorinated paraffin wax and naphthalene with aluminium chloride, coal tar or coal tar extracts. Usually about 0.1 to 1.0 percent of these materials is necessary to produce the desired degree of crystallization.

It will be observed that the above description of my invention is not to be construed as being limited to a treatment with a selective solvent such as the phenol described above. If desired, I may treat wax containing distillates directly for wax removal without any prior extraction with the selective solvent. Nor is the process limited to the treatment of wax containing distillates since the features of chilling an oil with a low solvent ratio to precipitate the wax and then adding precooled solvent to the chilled mass is advantageous in separating wax from residual oils, that is, oils which have been topped to separate fractions lighter than the lubricating oils present in the crude oil. When wax containing oils will not congeal at the dewaxing temperatures, I may dispense entirely with the addition of solvent to the oil to lower its viscosity prior to refrigeration and then add precooled solvent to the oil subsequent to refrigeration to alter its viscosity sufficiently to permit rapid removal of the wax from the oil.

When oils to be treated contain asphalt, such as residual oils of asphaltic and waxy nature, it is preferable to remove the asphalt prior to further treatment. This may be accomplished by dissolving the oil in a suitable amount of solvent such as liquid propane which will dissolve the oil and wax but will precipitate the asphalt which is allowed to settle from solution. The oil and solvent containing the wax may be decanted from the precipitated and settled asphalt and may be refined with a selective solvent as aforesaid in the presence of liquid propane or subsequent to its removal and the raffinate is then dewaxed as above described, or the deasphaltized oil may be treated directly for wax removal in accordance with the foregoing process.

When treating oils containing amorphous wax such as topped crude oils, it is preferable to add a sufficient amount of propane to the oil to give the proper degree of refrigeration by evaporation of propane under reduced pressure and yet to leave a sufficient amount of propane upon completion of the refrigeration to permit efficient handling of the viscous and mushy materials. In such cases approximately 3 to 5 volumes of liquid propane may be mixed with one volume of the oil under pressure sufficient to maintain the propane liquid and then the mixture is chilled to approximately −10 to −50° F. by evaporation of propane under reduced pressure until approximately one-half to two volumes of propane remain in the oil containing precipitated wax which is sufficient to handle the mixture. If the solution contains more propane than necessary to effect the desired refrigeration, the vaporization is continued until the proper amount of propane remains as aforesaid. Precooled propane to increase the ratio to 3½ to 4½ volumes of propane to one of the oil is then added. When treating oils containing amorphous wax, it is preferable to separate the wax by cold settling or centrifuging rather than by filtration whereas when treating oils containing crystalline wax, it is preferable to remove the wax by filtration.

The foregoing description of the wax precipitating stage has been described with particular emphasis on retaining one-half to two volumes of propane in the mixture upon completion of the desired refrigeration. I particularly desire to retain not more than this amount of propane in order to prevent the precipitated wax from settling to the bottom of the chiller and thus to permit withdrawal of the chilled mass from the chilling column and passage through the lines connecting the wax separator, without clogging the bottom of the chiller and lines. This is especially advantageous when residual oils containing wax are treated which have a decided tendency for the precipitated wax to settle out rapidly before it may be transferred to the wax settler, filter or centrifuge.

As stated above, I have found that increased filter and settling rates are obtained by refrigerating the oil in the presence of a low solvent to oil ratio and then separating the precipitated wax in the presence of added precooled solvent over the process of refrigerating the oil in the presence of a high solvent to oil ratio. For example, when chilling an oil and maintaining a volumetric ratio of two volumes of propane to one of oil and then adding two more volumes of precooled propane upon completion of the refrigeration so that a total of four volumes of propane are present to one volume of the oil, I have found that the average filter rates through the filter approximated 0.50 to 0.52 gallon of dewaxed lubricating oil per square foot of filtering surface per hour as compared to 0.35 gallon or an increase of approximately 46% when the wax precipitation was effected in the presence of a constant volumetric ratio of 4 to 1 which was maintained during chilling and the filtration effected in the presence of the same volumetric ratio of propane to oil. In other words, even though identical volumetric ratios were employed during filtration, better filter rates were obtained when the refrigeration was accomplished in the presence of a lower volumetric ratio of propane to oil. When operating by my process, the wax precipitates in such a manner as to form a pervious cake which does not obstruct the passage of the oil, whereas when the lower filter rates were obtained, the wax must have precipitated in a form which is impervious to the passage of the oil in the filter.

Another advantage of the process resides in the fact that I am able to obtain increased yields of oil per given quantity of oil treated, since less oil remains in the wax cake. A further advantage of my process resides in the fact that I may obtain oils of lower pour point because less solvent is employed initially than in the other case so that less wax will be dissolved by the solvent. The addition of precooled solvent does not redissolve any appreciable quantities of the precipitated wax.

It is to be understood that the above description is merely illustrative of preferred embodiments of my invention of which many variations may be made within the scope of the following claims by those skilled in the art without departing from the spirit thereof.

I claim:

1. A process of separating readily filterable wax from oils containing wax which comprises, mixing said oil with a liquefied normally gaseous hydrocarbon in an amount sufficient to render the mixture fluent at the dewaxing temperatures, chilling the mixture to a temperature of about 0° F. or below to precipitate wax, adding sufficient precooled solvent to render the final mixture readily filterable and filtering the precipitated wax from the diluted oil.

2. A process as claimed in claim 1 in which the liquefied normally gaseous hydrocarbon is liquid propane.

3. A process as claimed in claim 1 in which the chilling temperature is —10° F. or below.

4. A process for the separation of a readily filterable wax from an oil containing wax which comprises, mixing said oil with sufficient liquefied normally gaseous hydrocarbon diluent to furnish the necessary refrigeration by evaporation of a portion of said diluent and to render the mixture fluent at the dewaxing temperatures, evaporating a portion of said diluent to chill the mixture to about 0° F. or below, adding sufficient precooled diluent to render the final mixture readily filterable and filtering the precipitated wax from the diluted oil.

5. A process as claimed in claim 4 in which the chilling temperature is —10° F. or below.

6. A process as claimed in claim 4 in which the liquefied gaseous hydrocarbon is liquid propane.

7. A process for the separation of readily filterable wax from a wax containing oil which comprises mixing said oil with one half to two volumes of a liquefied normally gaseous hydrocarbon, cooling the mixture to a temperature of about 0° F. or below, adding sufficient precooled liquefied normally gaseous hydrocarbon to the chilled mixture to render the final mixture readily filterable and filtering the precipitated wax from the oil.

8. A process as claimed in claim 7 in which the chilling temperature is —10° F. or below.

9. A process as claimed in claim 7 in which the liquefied normally gaseous hydrocarbon is liquid propane.

10. A process for the separation of wax from a wax containing oil which comprises mixing said oil with an amount of a liquefied normally gaseous hydrocarbon diluent sufficient to produce the necessary refrigeration by vaporization of a portion of the diluent and to leave about one half to two volumes of liquefied normally gaseous hydrocarbon in the chilled mixture, vaporizing a portion of said diluent to chill the mixture to a temperature of about —10° F. or below and precipitate the wax, adding sufficient precooled diluent to render the final mixture readily filterable and filtering the precipitated wax from the diluted oil.

11. A process as claimed in claim 10 in which the liquefied normally gaseous hydrocarbon is liquid propane.

12. A process as claimed in claim 1 in which a crystallization regulator is added to the wax containing oil.

CLAUDE E. SWIFT.